J. C. HARALSON.
SOIL TREATING MACHINE.
APPLICATION FILED MAY 18, 1912.
1,060,548.
Patented Apr. 29, 1913.
2 SHEETS—SHEET 1.
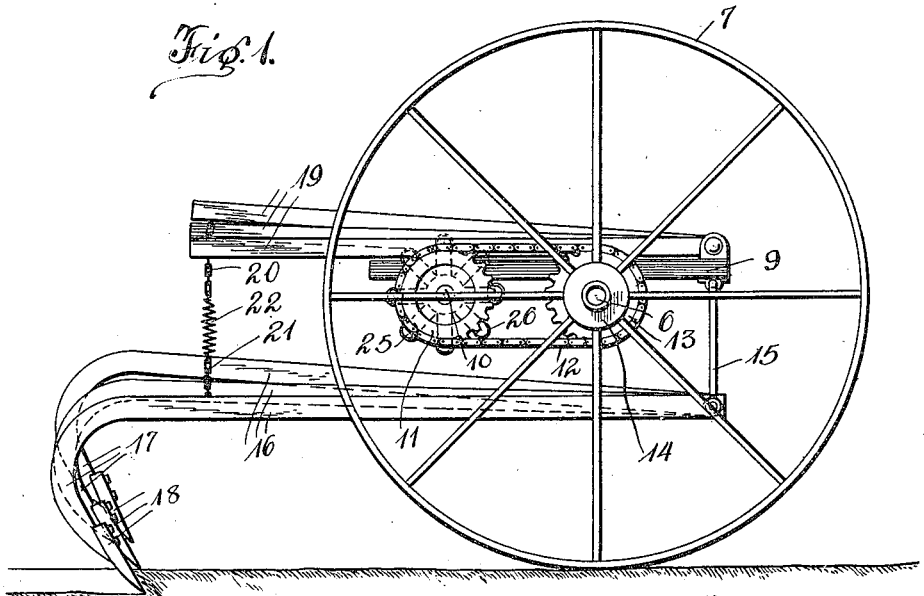
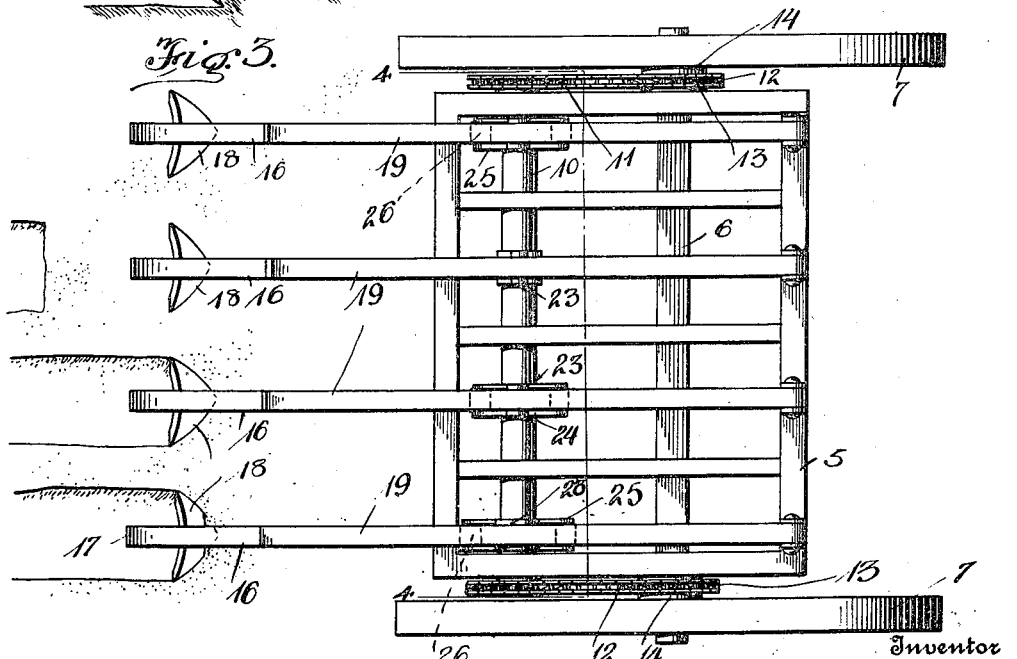
Witnesses
Ernest Crocker
E. L. Mueller
Inventor
James C. Haralson
By Victor J. Evans
Attorney J. C. HARALSON.
SOIL TREATING MACHINE.
APPLICATION FILED MAY 18, 1912.
1,060,548.
Patented Apr. 29, 1913.
2 SHEETS—SHEET 2.
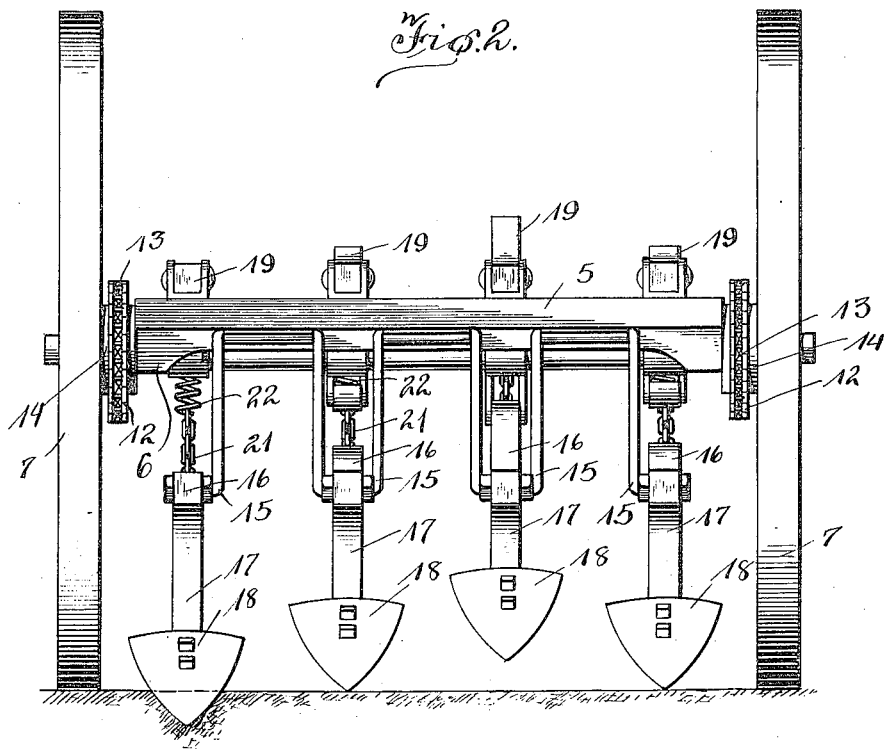
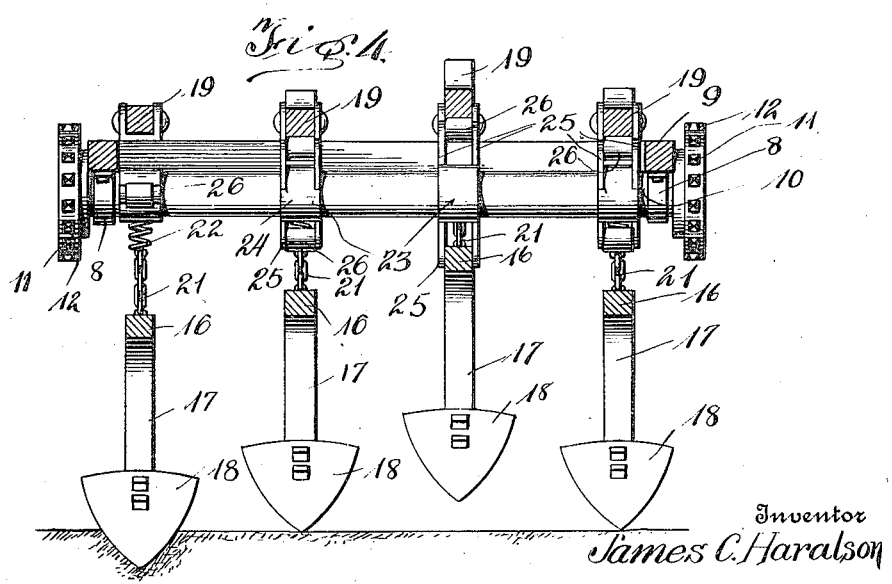
Witnesses
Ernest C. Knocker
E. L. Mueller
Inventor
James C. Haralson
By Victor J. Evans
Attorney

UNITED STATES PATENT OFFICE.

JAMES C. HARALSON, OF CROWELL, TEXAS.

SOIL-TREATING MACHINE.

1,060,548.   Specification of Letters Patent.   Patented Apr. 29, 1913.

Application filed May 18, 1912. Serial No. 698,297.

*To all whom it may concern:*

Be it known that I, JAMES C. HARALSON, a citizen of the United States, residing at Crowell, in the county of Foard and State of Texas, have invented new and useful Improvements in Soil-Treating Machines, of which the following is a specification.

The general object of this invention is the provision of a machine adapted for use in making short furrows in the soil for irrigating the same, said furrows being made for the purpose of retaining rain water or snow, whereby the same will be prevented from running off the soil thus giving it sufficient opportunity to settle and effectually irrigate the land.

In carrying out the objects of the invention generally stated above, it will be understood, of course, that the essential features thereof, are susceptible to changes in details and structural arrangements, one preferred and practical embodiment being shown in the accompanying drawings, wherein:—

Figure 1 is a side elevation of the machine constructed in accordance with the invention. Fig. 2 is a front elevation thereof. Fig. 3 is a top plan view. Fig. 4 is a section on the line 4—4 of Fig. 3.

Referring more particularly to the accompanying drawings in which like reference characters designate similar parts, it will be seen that the invention comprises the ordinary frame generally used in connection with cultivators, said frame having a front beam 5 and a stationary axle 6 upon which are rotatably mounted the ground wheels 7. Journaled in the bearings 8 carried by the supporting beams 9 which extend transversely of the front beam 5, is a rotatable shaft 10 having a sprocket wheel 11 secured to each end thereof, said sprocket wheels being engaged by the driving chains 12 which also engage similar sprocket wheels 13 which are secured to the hubs 14 of the ground wheels 7, whereby the shaft 10 is rotated when the machine is drawn forward.

Secured to the front beam 5 and extending longitudinally thereof is a depending crank shaft 15 having pivotally connected thereto at its lower ends a plurality of rearwardly extending plow beams 16 to the free ends of which are connected the shovel shanks 17 having the shovel blades 18 secured thereto.

A plurality of lifting bars 19 are pivotally connected to the beam 5 upon the upper side thereof and in alinement with the plow beams 16. The free ends of each of the lifting bars 19 are connected to the rear end of the adjacent plow beam by means of the chains 20 and 21 which are connected at one end to the lifting bar 19 and the plow beams 16 respectively, the free ends of said chains being connected by a spring 22 which is adapted to relieve the sudden tension upon said chains when the lifting bars are actuated.

A plurality of tripping devices 23 are fixedly secured upon the rotatable shaft 10 in alinement with the lifting bars 19 and are arranged at different angles so as to alternately actuate the lifting bars 19 whereby the furrows made in the soil are arranged in staggered relation. Each of the tripping devices 23 comprises a sleeve 24 which is secured to the axle 10 and which has extending therefrom in opposite directions a pair of forks 25 which have mounted in the free ends thereof the friction rollers 26. Upon the rotation of the shaft 10 it will be clearly obvious that the tripping devices 23 will be rotated therewith and the friction rollers mounted in said tripping devices will come in contact with the free ends of the lifting bars 19 thus causing the same to raise and lift the plow blades 18 out of engagement with the ground and upon disengagement of the rollers with the lifting bars, the latter will be free to drop and thus allow the blades 18 to again come in contact with the ground.

From the foregoing description taken in connection with the accompanying drawings, it will be seen that the invention contemplates providing a machine which is simple in construction, durable and effective in carrying out the purpose for which it is designed.

What is claimed is:—

1. A machine of the class described comprising a frame, a crank shaft depending from the forward end thereof, a plurality of plow beams pivotally connected to said shaft below said frame, lifting means pivoted at one end to said frame and connected at its other end to said plow beams, and means mounted in said frame and engaging said lifting means for alternately lifting said plow beams.

2. A machine of the class described comprising a frame, a shaft rotatably connected to said frame, a plow beam pivotally connected to said frame and extending rearwardly therewith, a lifting bar pivoted to said frame, a connection between the free end of said bar and the free end of said plow beam, a tripping device mounted upon said shaft and adapted to engage said lifting bar for lifting said plow beam, said tripping device comprising a pair of oppositely extending forks, and a friction roller mounted in the free end of each fork.

3. A machine of the class described comprising a frame, a shaft rotatably mounted therein, a plow beam pivotally connected to said frame and extending rearwardly therewith, lifting means connected to said plow beam, and a tripping device mounted upon said shaft and adapted to engage said lifting means, said tripping device including friction rollers adapted for engagement with said lifting means.

4. A machine of the class described comprising a frame, a shaft rotatably mounted therein, a plow beam pivotally connected to said frame, a lifting bar pivotally connected to said frame in alinement with said plow beam, a yieldable connection between the free ends of said lifting bar and said plow beam, and a tripping device mounted upon said shaft and adapted to engage said lifting bar for raising said plow beam.

5. A machine of the class described comprising a frame, a shaft rotatably mounted therein, a plow beam pivotally connected to said frame, lifting means pivotally connected to said frame, a yieldable connection between said lifting means and said plow beam, and means carried by said shaft and adapted for engagement with said lifting means for raising said plow beam.

In testimony whereof I affix my signature in presence of two witnesses.

JAMES C. HARALSON.

Witnesses:
M. M. RHOADS,
T. D. BRITT.